H. Ogborn,
Straw Cutter.
No. 96,609. Patented Nov. 9, 1869.

Witnesses:
C. W. Ferguson
D. H. Dougan

Inventor,
Harrison Ogborn

United States Patent Office.

HARRISON OGBORN, OF RICHMOND, INDIANA.

Letters Patent No. 96,609, dated November 9, 1869.

IMPROVEMENT IN STRAW-CUTTERS.

The Schedule referred to in these Letters Patent and making part of the same.

*To all whom it may concern:*

Be it known that I, HARRISON OGBORN, of Richmond, in the county of Wayne, and State of Indiana, have invented a certain new and useful Fodder and Straw-Cutter and Corn-Sheller combined; and I do hereby declare the following to be a clear description of the construction and operation of the same, reference being had to the annexed drawings, making part of this specification, in which—

My improvement consists in devices for adjusting the balance-wheel, for attaching the knives, and for holding down the pressure-board and upper roller of a straw-cutter.

A represents the feed-box.

B, the balance-wheel, carrying the knives C C upon the radial arms D D, and furnished with sheller-teeth, as shown at *a a a a*, upon the outside of the rim, which is made slightly concave.

The balance-wheel is attached to the end of the shaft E, which is screw-threaded, by means of a nut or hub, F.

The hub is held in position by a pin, G, passing through holes *c c* in the hub, and through the oblong or slotted hole X in the shaft E.

In this manner, the wheel may be adjusted and held within a quarter of a revolution.

The knives C C are attached directly to the arms D D, by means of screws *s s s s*, and are adjustable with the wheel by the devices just described, so as to present a proper cutting-edge to the face-plate J.

Attached to the front right-hand post H is a toothed plate, I, supported by a standard, K, the lower end of which is bevelled, so as to fit snugly to the front of the post, and so that it may be sprung in and adjusted by the bolt and screw L.

This toothed plate is curved, so as, in combination with the concave rim of the balance-wheel, to form a space suitable for receiving and holding an ear of corn, which, from the revolution of the balance-wheel, receives a spiral motion as it passes down between the wheel and plate I.

The balance-wheel shaft is operated by the bevelled-gear wheels M and N, the latter revolving upon the shaft O, which is the crank-shaft, and carries the lower roller.

Figure 1:
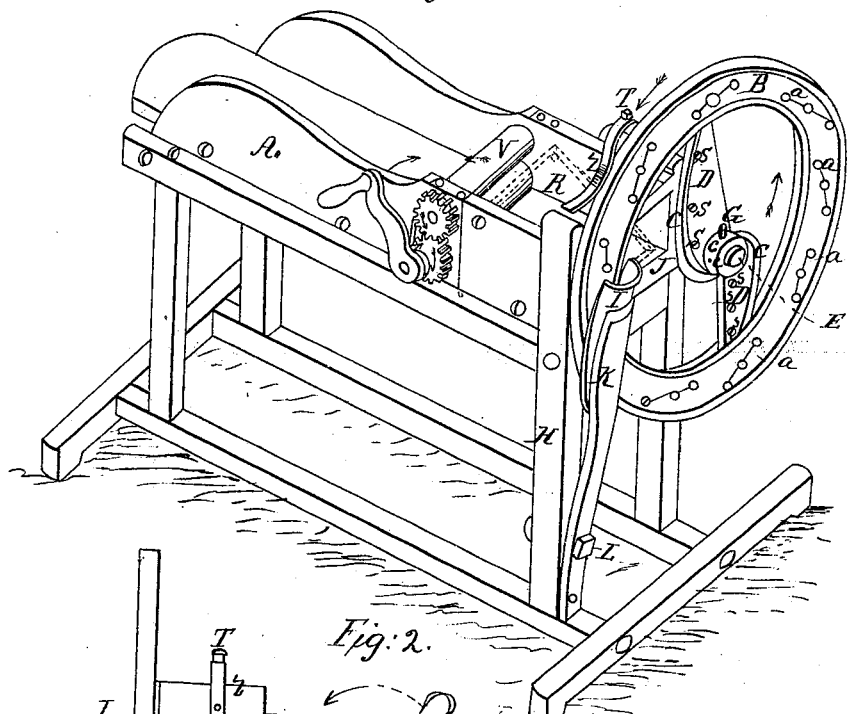
Figure 1 is a perspective view of my improved combined straw-cutter and corn-sheller.
Figure 2:
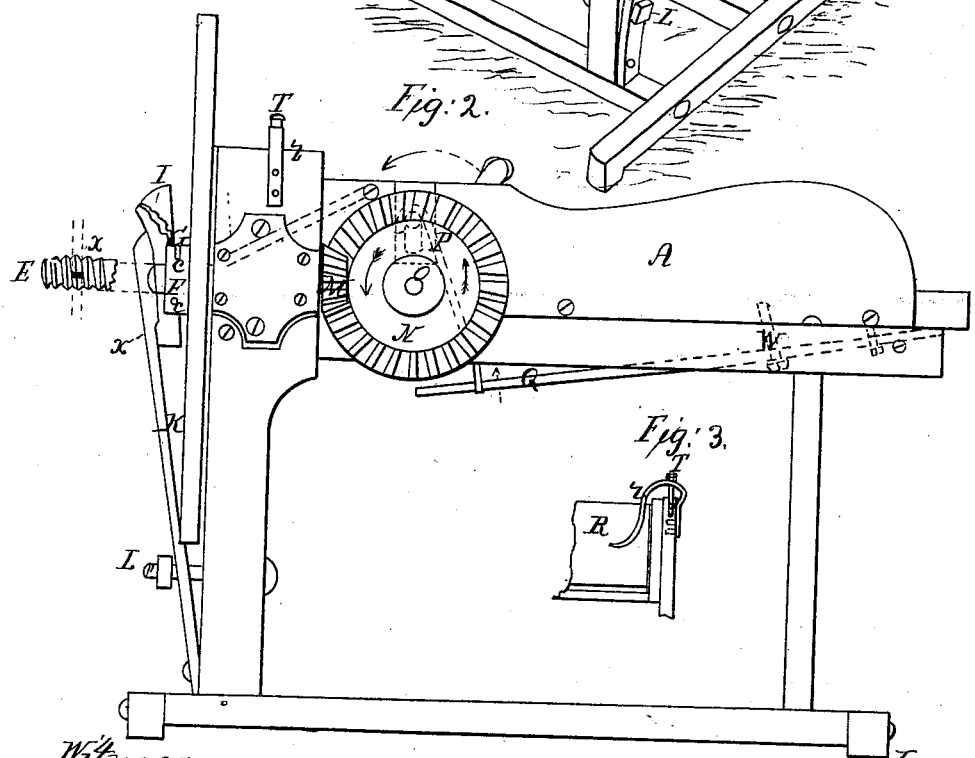
Figure 2 is a view of the left side of the same.

The upper roller V is geared, as shown in fig. 1, and held against the lower roller by a hook and rod, P, shown in dotted lines in fig. 2, attached to a spring-bar, Q, which is also bevelled at its upper end, where it is attached to the bottom of the feed-box, and adjusted by screw W.

The cogs upon the rollers are made sufficiently long to permit them to be separated sufficiently to allow the straw and fodder to pass between them.

Figure 3:
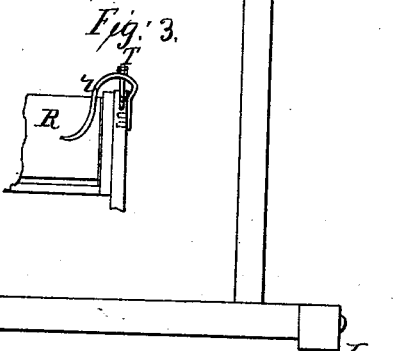
Figure 3 is a detached view of the spring for holding down the guide and pressure-board.

In front of the feed roller is a pressure-board, R, shown in red lines in fig. 1, and in dotted lines in fig. 2, which is held down upon the straw or fodder by the bent spring Z, attached to the outside of the post, as shown in figs. 1 and 3, and passing over the top of the post, and extending to the board.

The spring may be adjusted by the screw T, so as to obtain a greater or less pressure upon the board.

What I claim as new and useful, and desire to secure by Letters Patent, is—

1. The described mode of attaching two knives to the radial arms of the balance-wheel of a straw-cutter, in combination with the devices for adjusting the knives to the face-plate J, as herein set forth.

2. Also, the combination of the pin G, holes *c c*, and slotted hole X, for the purpose of retaining the balance-wheel in any desired position upon the shaft, or of permitting of the adjustment of the knives, as described.

3. Also, the adjustable spring Z, in combination with the pressure-board R, when arranged as described, for the purpose of holding the straw and fodder compactly, as described.

4. Also, the combination of the spring-bar Q, when made adjustable, as described, hooked rod P, and roller V, as and for the purposes described.

HARRISON OGBORN.

Witnesses:
JOHN Z. BLISS,
LEONIDAS OGBORN.